United States Patent [19]
Hall et al.

[11] Patent Number: 5,751,548
[45] Date of Patent: May 12, 1998

[54] DOCKING STATION FOR A PORTABLE COMPUTER PROVIDING ROTATIONAL MOVEMENT OF THE COMPUTER'S VIEWABLE SCREEN IN THREE DIFFERENT PLANES

[75] Inventors: Charles William Hall; Julian Dominick Rizzi, both of Endicott; John Arthur Stubecki, Nichols, all of N.Y.

[73] Assignee: International Business Machines Corporation, Armonk, N.Y.

[21] Appl. No.: 810,226

[22] Filed: Feb. 28, 1997

Related U.S. Application Data

[63] Continuation-in-part of Ser. No. 645,461, May 28, 1996.
[51] Int. Cl.⁶ .................. G06F 1/16; A47B 9/00
[52] U.S. Cl. .................. 361/686; 361/683; 248/124.1; 248/122.1
[58] Field of Search .................. 361/683, 686; 312/223.2, 223.3; 248/122, 122.1, 124.1, 917, 919, 920, 921, 922, 923, 125.7, 125.1; 364/708.1; G06F 1/16

[56] References Cited

U.S. PATENT DOCUMENTS

| | | |
|---|---|---|
| 4,365,561 | 12/1982 | Tellier et al. . |
| 4,690,362 | 9/1987 | Helgeland . |
| 4,733,838 | 3/1988 | Van Der Lely .................. 248/124 |
| 4,854,538 | 8/1989 | Schalscha . |
| 4,946,120 | 8/1990 | Hatcher . |
| 5,161,766 | 11/1992 | Arima .................. 248/447 |
| 5,177,665 | 1/1993 | Frank et al. . |
| 5,240,215 | 8/1993 | Moore . |
| 5,362,025 | 11/1994 | Trom et al. . |
| 5,408,382 | 4/1995 | Shcultz et al. .................. 361/686 |
| 5,436,792 | 7/1995 | Leman et al. . |
| 5,460,547 | 10/1995 | Belt et al. .................. 439/638 |
| 5,544,010 | 8/1996 | Shcultz et al. .................. 361/686 |
| 5,590,607 | 1/1997 | Howard .................. 108/98 |
| 5,606,341 | 2/1997 | Aguilera .................. 345/87 |
| 5,630,566 | 5/1997 | Case .................. 248/122.1 |

*Primary Examiner*—Lynn D. Feild
*Attorney, Agent, or Firm*—Lawrence R. Fraley

[57] ABSTRACT

A portable computer docking station that is capable of allowing rotational movement of the computer's viewable screen in at least three different planes, thereby facilitating viewing and other utilization (e.g., using a pen) of the screen within a motor vehicle. The docking station defined herein is provided with a means for heating the portable computer when the computer is positioned in the docking station's holder portion. The heated holder portion effectively solves the problem of maintaining a portable computer at an operable temperature in cold environments. A vehicular computer assembly is also provided.

22 Claims, 11 Drawing Sheets

DOCKING STATION FOR A PORTABLE COMPUTER PROVIDING ROTATIONAL MOVEMENT OF THE COMPUTER'S VIEWABLE SCREEN IN THREE DIFFERENT PLANES

CROSS-REFERENCE TO COPENDING APPLICATIONS

This application is a continuation-in-part of Ser. No. 08/645,461, entitled "Docking Station For Portable Computer", filed May 13, 1996, inventors D. L. Clark et al.

TECHNICAL FIELD

This invention relates generally to a docking station for laptop computers, and more particularly to a docking station adapted for installation in a motor vehicle or other structure occupied by one or more human operators.

BACKGROUND OF THE INVENTION

The compact size, light weight, and self-contained power features of laptop computers make these products particularly suitable for use in motor vehicles, such as automobiles, trucks, and locomotives, and other structures (e.g., airplanes). Several arrangements have been proposed for mounting computers of this type in automobiles or other vehicles. For example, U.S. Pat. No. 4,854,538 (issued Aug. 08, 1989 to Craig Von Schalscha) describes a device for mounting a personal computer in a motor vehicle having an elevated tunnel and a seat adjacent the tunnel. This device requires use of a relatively complicated articulated arm member. In another mounting arrangement, a support for securing a laptop computer to an automobile seat is described in U.S. Pat. No. 4,946,120, issued Aug. 7, 1990 to David O. Hatcher. An upper unit of this support holds the portable computer and partly rotates on a lower unit secured to the seat. In yet another arrangement, described in U.S. Pat. No. 5,177,665, issued Jan. 5, 1993 to Michael J. Frank, et al, a mounting assembly for a small portable computer has a housing adapted for attachment to the steering wheel of a vehicle. The screen part of the computer is pivotally oriented relative to the assembly's support. The aforementioned structures are considered relatively complex while not fully allowing maximum visible accessibility to the computer's viewing screen.

Another problem encountered in the use of portable computers in vehicles, particularly in cold climates, is the reduced definition, or contrast, on LCD screens typically used in laptop computers. This characteristic is especially noticeable during winter operation, especially after the computer has been stored in the vehicle for a prolonged period, for example, in police or emergency vehicles. Typically it takes several minutes for the vehicle's engine to warm up, such that the vehicle's interior can then be warmed, and finally such that the computer can be brought to a suitable operating temperature. Such operation may be deemed unsatisfactory, particularly in emergency vehicles.

The present invention is directed to overcoming the problems set forth above. It is desirable to have a docking station for portable computers that will support the computer within a vehicle and which enables relatively easy rotation thereof to a number of different positions so that the computer can be readily used, or viewed, by an occupant and/or operator of a motor vehicle. It is also desirable to have a docking station that can be mounted in a vehicle at a position that does not interfere with viewing the vehicle's gauges or operation of the vehicle's controls. It is also desirable to have a means for maintaining the computer at a predetermined temperature so that the computer is almost instantly usable, upon demand, even in cold environments.

It is believed that such an invention would constitute a significant advancement in the art.

DISCLOSURE OF THE INVENTION

It is, therefore, a primary object of the invention to enhance the portable computer art through the provision of a docking station which permits computer screen adjustment through at least three planes of rotation.

It is another object of the invention to provide such a docking station which also enables heating of the computer during relatively cold periods.

It is yet another object of this invention to provide such a docking station which can be relatively easily operated and which is not of complex design.

It is still another object of this invention to provide such a docking station which is relatively inexpensive to produce and install in a typical motor vehicle.

It is yet another object of this invention to provide a vehicular computer assembly including a portable computer and base and holder portions for holding the computer.

In accordance with one aspect of the present invention, there is provided a docking station for a portable computer which includes a base portion and a holder portion positioned on the base portion and adapted for holding the portable computer at a plurality of preselected positions in at least three different planes. The docking station may also include means for heating the computer, should such heating be desired. Other features of the instant invention include providing the holder portion of a size sufficient to hold a port replicator attachable to the portable computer.

In accordance with another aspect of the present invention, there is provided a vehicular computer assembly comprising a portable computer including a viewable screen, a base portion adapted for being positioned within a motor vehicle and a holder portion positioned on the base portion and including means for holding the portable computer therein such that the viewable screen of the portable computer can be rotationally adjusted in at least three different planes.

BRIEF DESCRIPTION OF THE DRAWINGS

FIG. 8 thus also illustrates a vehicular computer assembly which includes a portable computer in combination with the base and holder portions of a docking station;

BEST MODE FOR CARRYING OUT THE INVENTION

Figure 1:
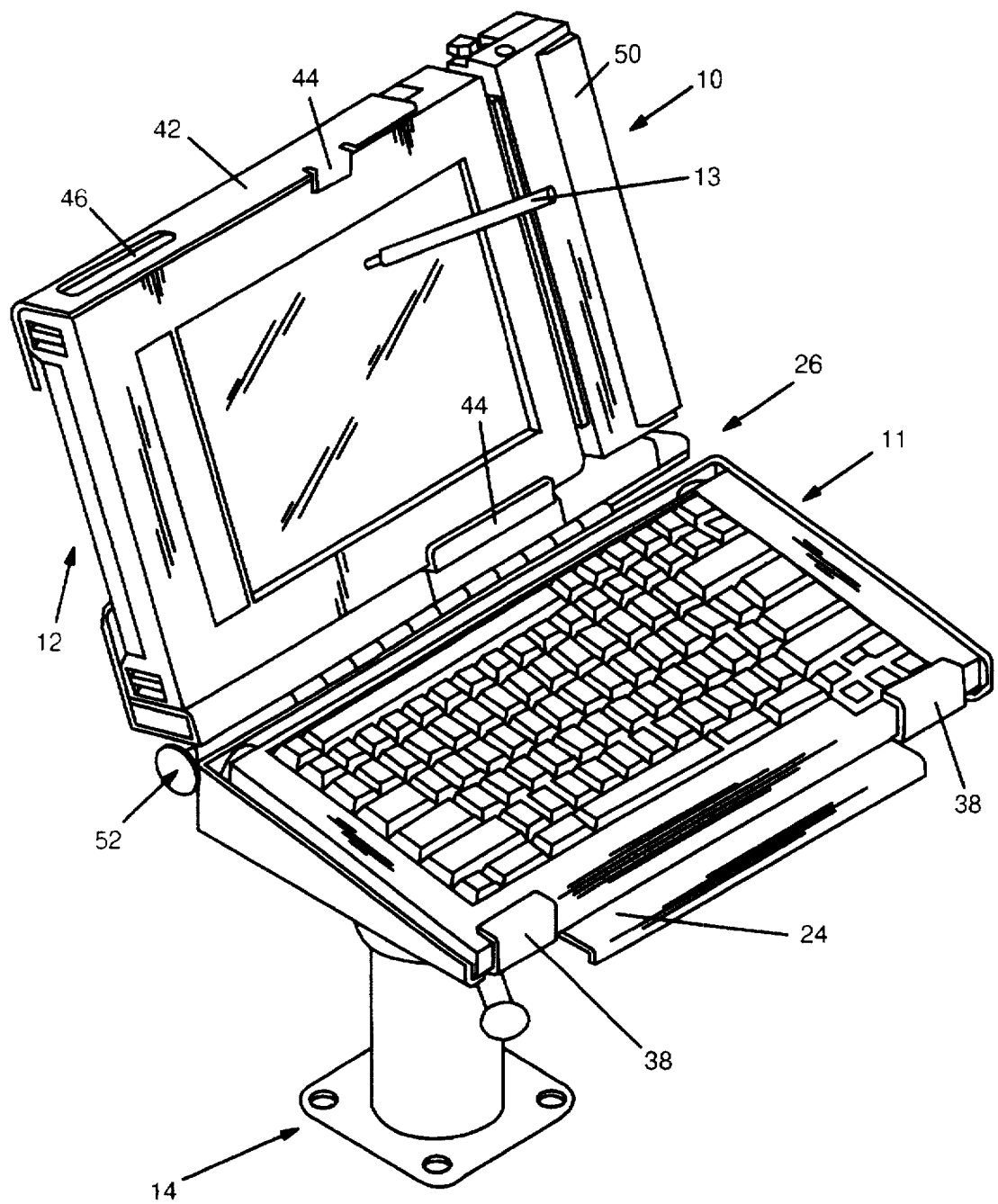
FIG. 1 is a three-dimensional view of a docking station as defined in Ser. No. 08/645,461 showing one example of a portable computer installed in the docking station.

For a better understanding of the present invention, together with other and further objects, advantages and capabilities thereof, reference is made to the following disclosure in connection with the above-described drawings.

The docking station of Ser. No. 08/645,461, suitable for use for protectively supporting a portable computer during use in a vehicle, is generally indicated in FIGS. 1–7 (only partly in FIG. 5) by the reference numeral 10. In the embodiment shown therein, the docking station 10 is particularly adapted to protectively enclose and support a portable computer, such as an IBM ThinkPad™ Model 730T/730TE portable computer. (ThinkPad is a trademark of IBM.) The IBM ThinkPad™ 730 series portable computer is a pen-based computer that includes an integral display screen 12, a pen 13 capable of inputting "written" messages and characters on display screen 12, a PCMCIA slot 46 and port for connection with other peripheral equipment such as a printer, and a keyboard port for adding a keyboard 11, if the latter is desired. As understood from the following, the holder of the presently claimed invention is adapted for holding only the computer's viewable screen 12 in the event a keyboard is not utilized (such a keyboard provides duplicative functions to those provided by pen 13, but may be desired by some operators more familiar with this structure). It is also possible that the invention's holder hold and retain the computer's keyboard, to thus indirectly hold the viewable screen which is pivotally oriented with respect to the keyboard. A port replicator 50 may also be provided, thereby enabling the computer to be readily connected to various peripheral components, including an external power supply, if desired. While the description of the computer herein is primarily directed to use of IBM ThinkPad™ 730T/730TE portable computers, the docking station can be easily reconfigured to accept other laptop computers, notebook computers, personal notepads, and the like. For better clarity, and understanding of the holder portion of the invention, the aforementioned computer and associated viewable display screen is omitted in its entirety from some of the Figs., including particularly FIGS. 8–11, where the invention's holder is specifically illustrated.

The docking station 10 of Ser. No. 08/645,461 includes a base portion 14 that, in the illustrative embodiment, is adapted for mounting to the floor or other interior surface of a vehicle, such as an automobile, truck, or locomotive. This base portion 14 includes a vertical column 16 that is attached, such as by welding, to a flange 18 adapted for attachment to the floor of the vehicle. The base portion of Ser. No. 08/645,461 also includes an upper cylindrical portion (rotational sleeve) 20 (FIG. 4) adapted to slidably engage the column 16 and which also has an upper flange 22 (FIG. 5) that is attached to an upper end of the cylindrical portion 20 and adapted to mount directly to a support portion 24, which is designed specifically in Ser. No. 08/645,461 to retain the keyboard 11 of the portable computer. Preferably, the cylindrical portion 20 of the holder in this embodiment is vertically adjustable with respect to column 16, such as by one or more set screws threadably mounted in the column 16 that are adapted to engage one of a plurality of vertically spaced apart grooves (not shown) in the upper end of the cylindrical portion 20. (Such screws are not necessary in the holder portion of the instant invention, but may be optionally provided if desired.)

Figure 5:
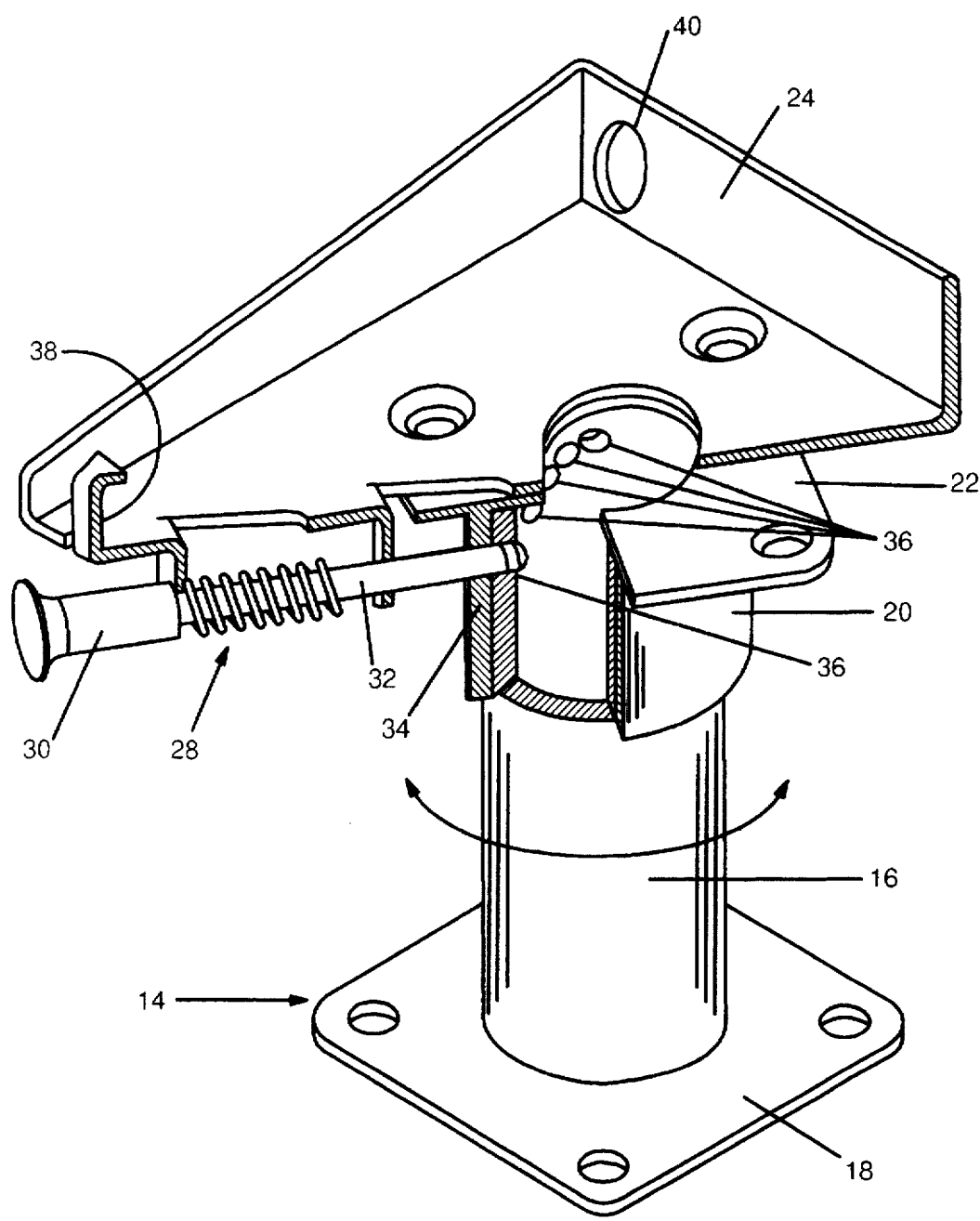
FIG. 5 is a partial three-dimensional view of the support portion of the FIG. 1 docking station with portions cut away to show details of the locking arrangement for this structure.

As best shown in FIG. 5, docking station 10 includes a means 28 for selectively maintaining the holder at a predetermined position with respect to the station's base portion 14. In the illustrated embodiment, the means 28 for selectively maintaining the holder 26 includes a spring-biased pin 30 mounted on a pair of flange surfaces extending downwardly from support portion 24, and has a distal end 32 that extends through a single aperture 34 in the cylindrical portion 20 of base member 14. Pin 30 may selectively engage one of a plurality of radially spaced-apart apertures 36 provided in column 16 of the base, to provide for additional rotation of support 24 (and thus the portable computer retained therein) relative to the fixedly positioned column 16.

Figure 2:
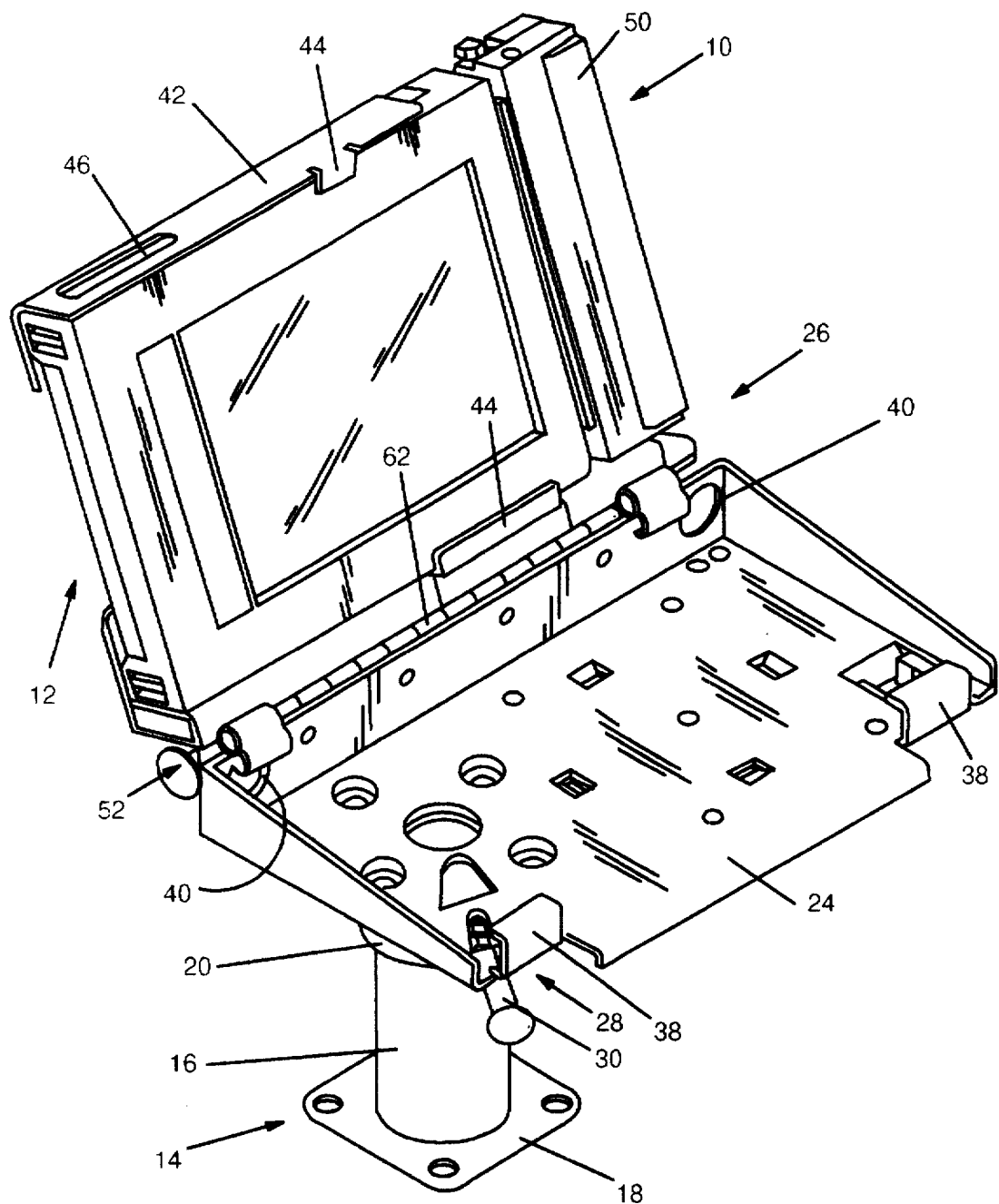
FIG. 2 is a three-dimensional view of the FIG. 1 docking station wherein the keyboard and pen associated with the portable computer have been removed, the support portion of this structure adaptable for use with the present invention.
Figure 3:
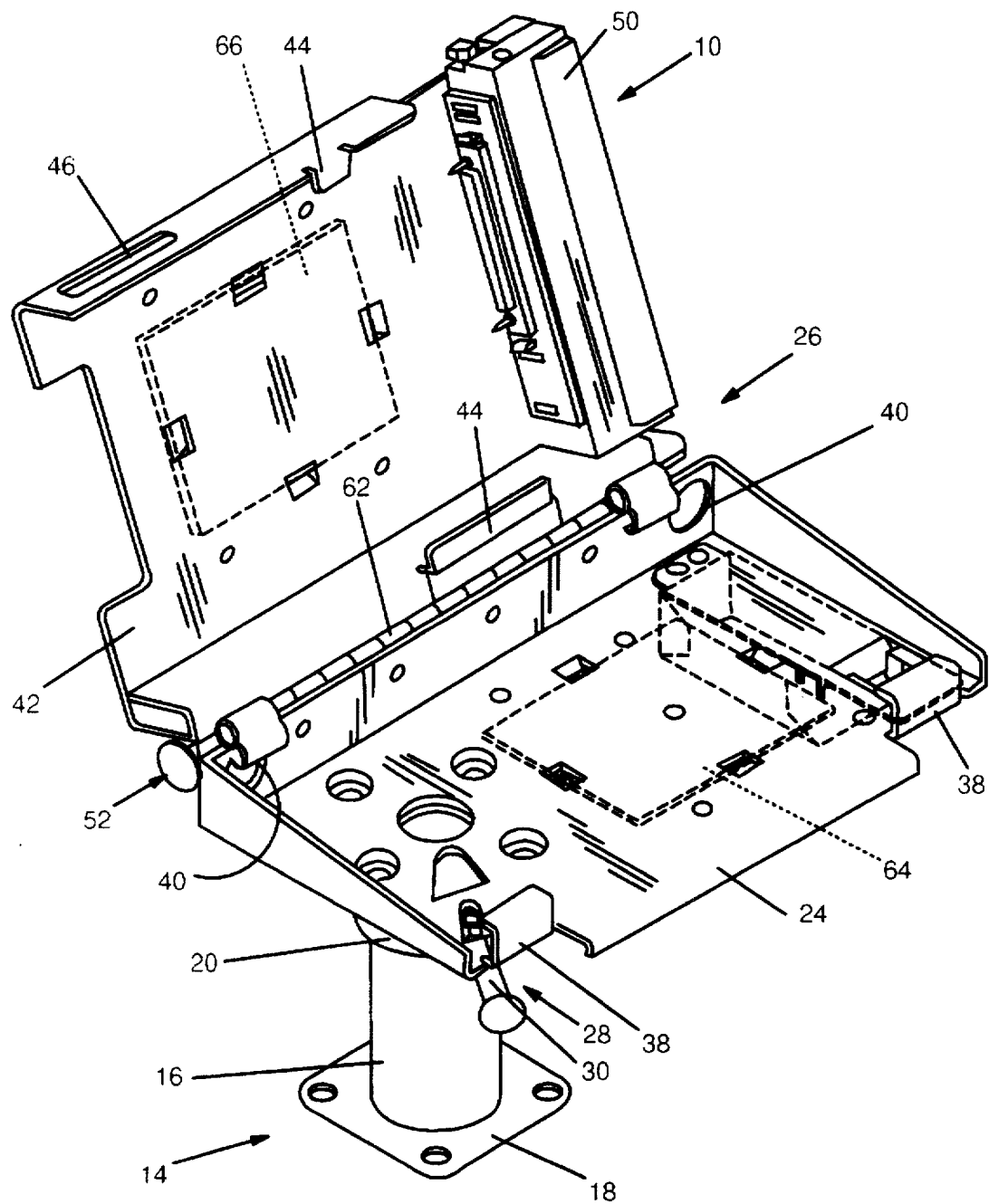
FIG. 3 is a three-dimensional view of the FIG. 1 docking station with the portable computer entirely removed.
Figure 4:
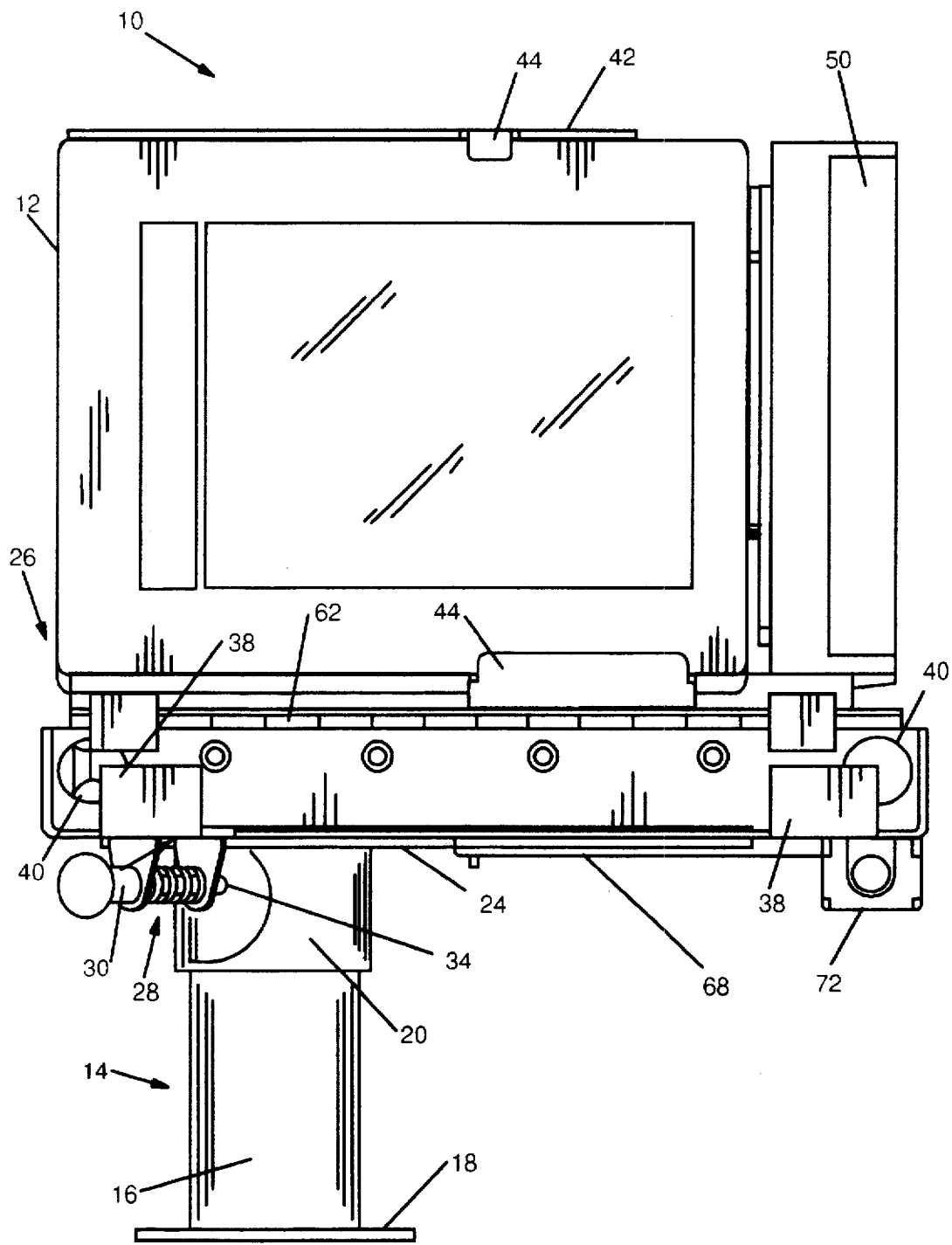
FIG. 4 is a front elevational view of the FIG. 1 docking station.

The keyboard support portion 24 of the holder in FIGS. 1–7 also includes a plurality of clip elements 38 (see especially FIGS. 1 and 2) which are adapted to retain the keyboard 11 in secure engagement within support portion 24. Other retainer arrangements, such as straps, fabric locking strips, i.e., Velcro™ tape, may be used either in addition to the above-described clip elements 38, or as the sole retention members. (Velcro is a trademark of Velcro, U.S.A.) Desirably, the support portion 24 also includes one or more apertures 40 which provide a passageway for a cable extending between the keyboard 11 and the portable computer. In the embodiment of FIGS. 1–7, the holder 26 also includes a viewable screen support portion 42. As shown in FIGS. 1, 2 and 3, the viewable screen support portion includes a pair of clips 44 that frictionally retain the viewable display screen 12 at a fixed position with respect to support portion 42, and also includes a PCMCIA slot 46 and apertures 48 (FIG. 6) through which screws are installed to retain the port replicator 50 attached to the portable computer. When installed into the support portion 42 of the holder, the input/output ports of the computer are engaged with the port replicator 50 and the PCMCIA slot of the computer is aligned with the opening 46 so that external communication can be established with the computer.

Figure 6:
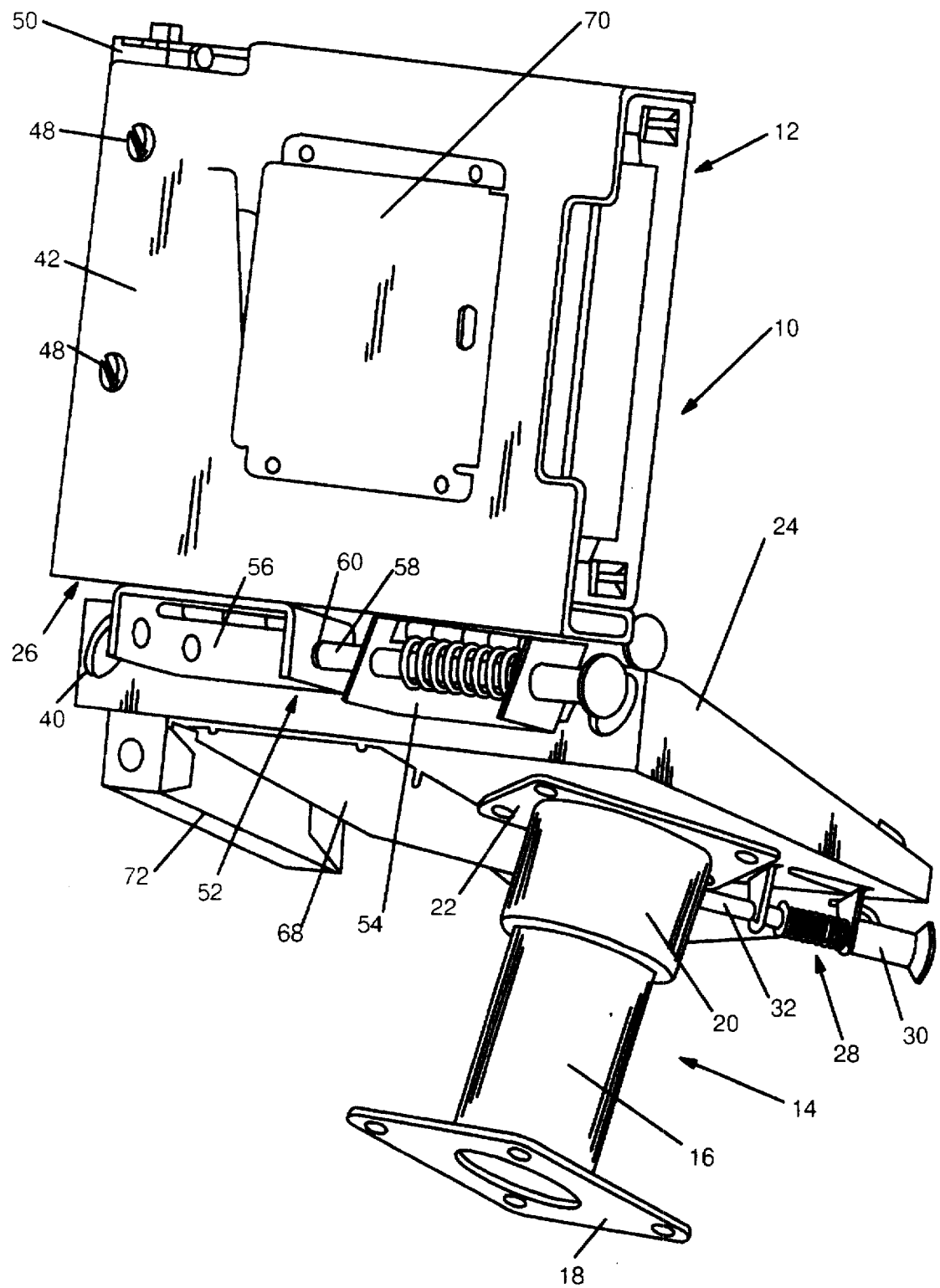
FIG. 6 is a three-dimensional rear view of the FIG. 1 docking station, further showing the locking arrangement in FIG. 5, it being understood that the present invention may utilize some of the features of this structure.

The docking station 10 of FIGS. 1–7 (Ser. No. 08/645, 461) also includes a means 52 (FIG. 6) for maintaining the screen support portion 42 of the holder at an open position with respect to the keyboard support portion 24. It will be understood from the teachings herein that the holder portion of the instant invention is capable of having the keyboard part of the portable computer therein while allowing the viewable screen to open as desired by the operator. Alternatively, the holder can directly engage and hold the viewable screen (e.g., if only the pen is to be used). As shown in FIG. 6, one arrangement of the means 52 for maintaining the screen support portion 42 at an open position includes a first U-shaped bracket 54 attached to support portion 24, and a second U-shaped bracket 56 attached to support portion 42. It is understood that U-shaped brackets 54 and 56 are not the bracket assemblies defined hereinbelow with respect to FIGS. 8-12 of the instant invention, but can be utilized in combination therewith if the holder portion of the invention is used to hold the computer's keyboard (if being utilized) rather than the viewable screen only (in which case such brackets 54 and 56 would not be needed). A spring-loaded pin 58 extends through a pair of holes provided in the bracket 54 and has a length sufficient to engage an aperture 60 provided in U-shaped bracket 56 which in turn is aligned with the pin 58 when support portion 42 is in the open position. Support portion 42 of the holder is attached to support portion 24 by a hinge 62 (FIG. 4) and is thus movable between a closed position in which support portion 42 covers the lower (keyboard) support portion 24, and in an open position shown in the drawings at which the support portion 42 is positioned at a viewing position. Although not shown, it is desirable that support portion 42 be provided with a lock interconnected with the keyboard support portion 24 to provide secure storage of the portable computer when the screen support portion 42 is at the closed position.

Figure 7:
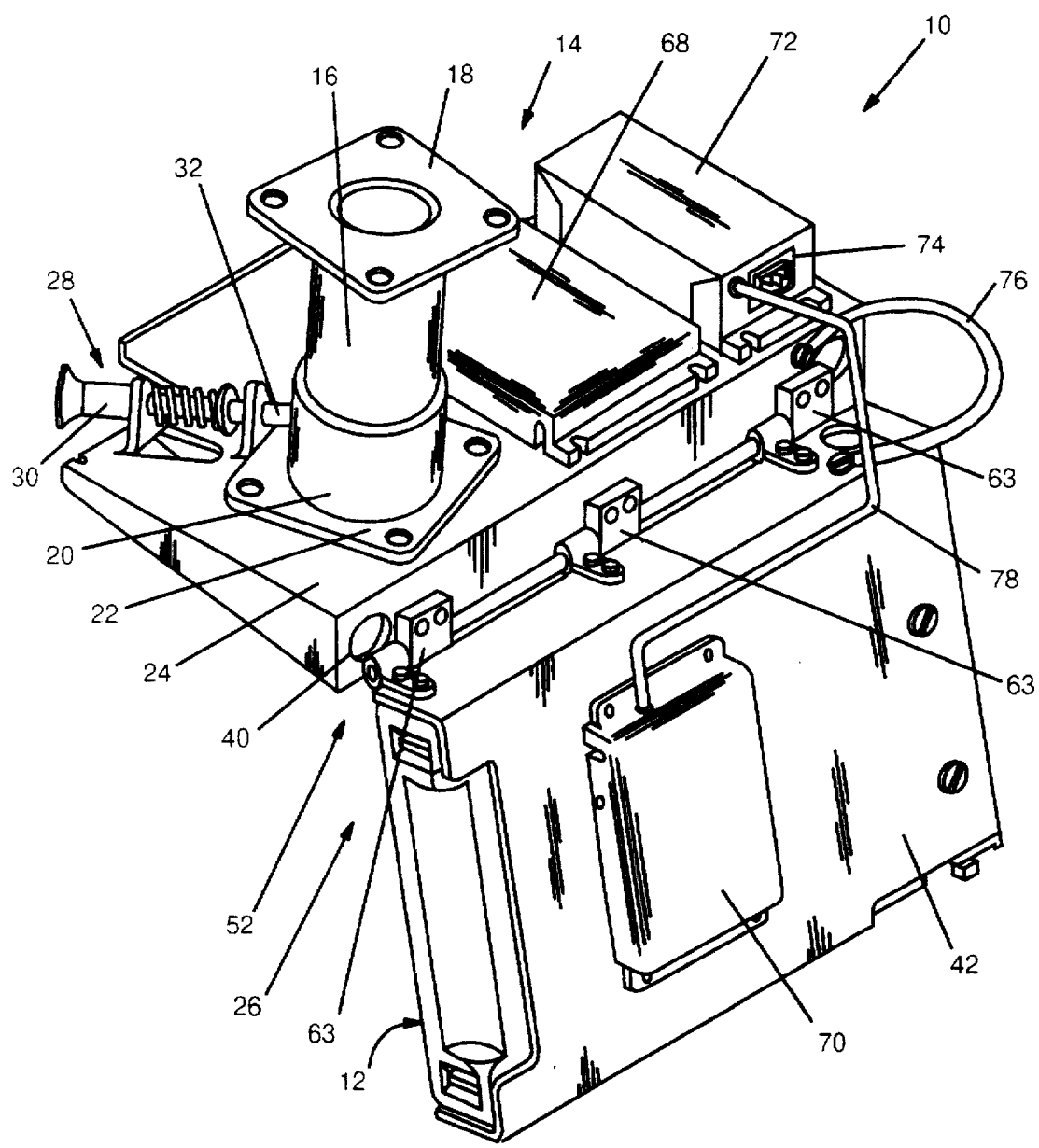
FIG. 7 is a three-dimensional bottom view of the FIG. 1 docking station.

Alternatively, means 52 for maintaining the support portion 42 at the described open position may comprise a plurality of position control hinges 63, as shown in FIG. 7. Position control hinges produce high frictional torque within the hinge to keep the hinge at a set position.

One example of such position control hinges, known as Smooth Touch™ hinges, are available from CEMA Technologies, Inc., Bridgeport, Pa. (Smooth Touch is a trademark of CEMA Technologies.) Other devices suitable for use in maintaining support portion 42 in an open position include spring loaded detent hinges and locking support arm arrangements.

Importantly, the docking station of the present invention, like that in Ser. No. 08/645,461, includes a means for heating the portable computer when the computer is positioned in the invention. In the preferred embodiment, the means for heating the portable computer includes a first heating element detachably mounted on the invention's support portion, and if a keyboard is used, a second heating element detachably mounted on the pivotal screen support portion. Such heating elements are represented by the numerals 64 and 66 in FIG. 3 with respect to the Ser. No. 08/645,461 embodiment. It is understood that such heating elements would occupy similar positions on the various parts of the docking station of the invention (e.g., a heating element would be positioned on support portion 42' in FIG. 8 relative to the computer's screen portion 12' held thereby). The above understanding in mind, such heating elements are not shown in FIGS. 8-12. Preferably, the first and second heating elements are thin, flexible resistance heating pads that are positioned within clips provided in the outer surface of the respective support portions, and are maintained in pressure contact with the respective outer surfaces by a pair of plates (68, 70 in FIGS. 6 and 7) that are also received within the clips. Suitable flat, thin, coiled heaters embedded in a silicone rubber matrix are preferably used and commercially available from Omega Corporation.

Each of the heating elements for use in the invention are preferably electrically connected to a 110 volt supply through a junction box (e.g., 72 in FIG. 6) positioned on the bottom surface of the invention's support portion. Desirably, a thermostat, in contact with the bottom surface of this support portion, is positioned within the junction box and serves as a temperature controller for the coiled heating elements. Preferably, this thermostat is preset to maintain the surface temperature of the keyboard support at a temperature above about 32° F. The upper limit of the thermostat is preset to discontinue heating when a specified temperature (e.g., about 110° F.) is exceeded. Preferably, the keyboard and screen support portions, if both are used, are formed of a material having good thermal conductance properties, such as cold rolled steel or aluminum. Desirably, the material forming the invention's holder has a thermal conductivity of at least about 9.4 Btu·ft/hr·ft$^2$·F (16.3 W/m·K), which is the thermal conductivity of standard austenitic grade wrought stainless steel. Preferably, the invention's heating elements are powered by an external source, such as standard 110 volt line current, to avoid drain on a vehicular or auxiliary battery source. This is especially important if heating is to be provided over a considerable period of time, e.g., overnight.

A socket receptacle (e.g., 74 as shown in FIG. 7) is provided on the junction box 72 to provide interconnection with the power source. A ground wire 76 may be connected between the two support portions (e.g., 42 and 24) to provide a mutual electrical grounding of these support portions. An electrical lead 78 (FIG. 7) provides power from the junction box to the heating element in the invention's support portion, and a similar electrical lead, not shown, provides power to any other heating elements that might be utilized.

Figure 8:
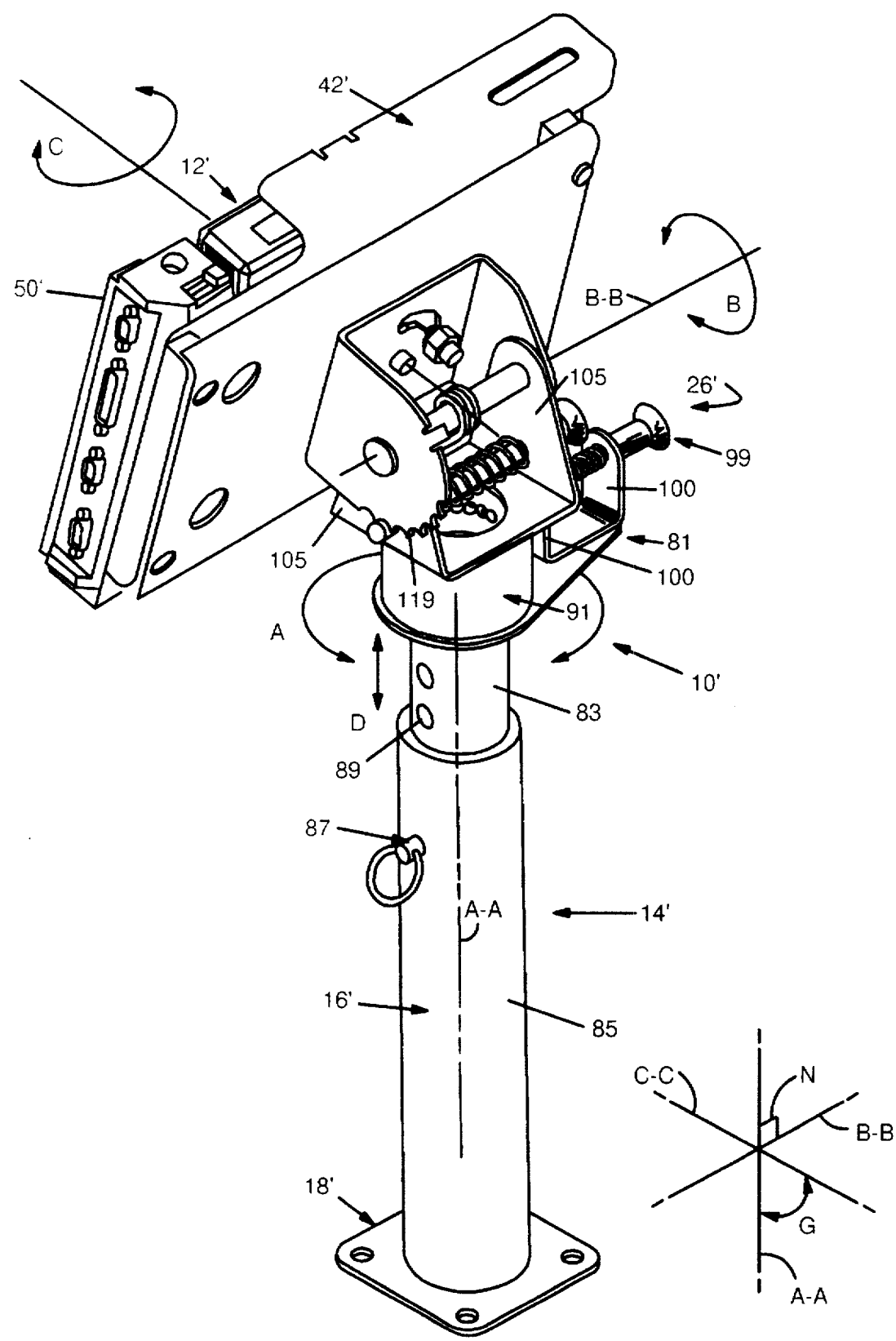
FIG. 8 is a three-dimensional view of a docking station in accordance with the teachings of the present invention, this docking station shown holding the viewing screen portion of a portable computer.

In accordance with the teachings of the present invention, there is shown in FIG. 8 a new and improved docking station 10' in accordance with one embodiment of the invention. Docking station 10' comprises a base portion 14' which, like base portion 14 in FIGS. 1-7, is designed for being mounted within a motor vehicle. A flanged bottom segment 18' is preferably used for this purpose. Docking station 10' further includes a holding portion 26' which, as defined herein, affords rotational movement of the viewable screen 12' of a portable computer retained within a support plate member 42' which forms part of the invention.

In accordance with the preferred teachings herein, only the viewable screen part 12' of the portable computer is utilized, this computer, of the type described hereinabove (e.g., IBM ThinkPad Model 730T or 730TE) being operational utilizing only a pen (such as pen 13 in FIG. 1) and does not, therefore, require a separate keyboard structure. It is to be understood, however, that the support plate member 42' may instead hold such a keyboard structure of the portable computer therein, thus enabling the viewable screen of the computer to also rotate outwardly from the position substantially shown in FIG. 8, e.g., using the pivotal assembly in FIGS. 1-7. The invention is thus uniquely capable of holding either of these two parts of a portable computer should the optional part (keyboard) be desired, e.g., by the computer operator.

As seen in FIG. 8, support plate member 42' may also have a port replicator 50' positioned thereon and coupled to the viewable screen 12' in much the same way as in the embodiment of FIGS. 1-7.

Significantly, the invention is able to provide rotational movement of the computer's viewable screen (and thus member 42') in at least three different planes, thus greatly facilitating viewing and utilization of the portable computer. In FIG. 8, these three planes are represented by the letters A, B and C.

Figure 9:
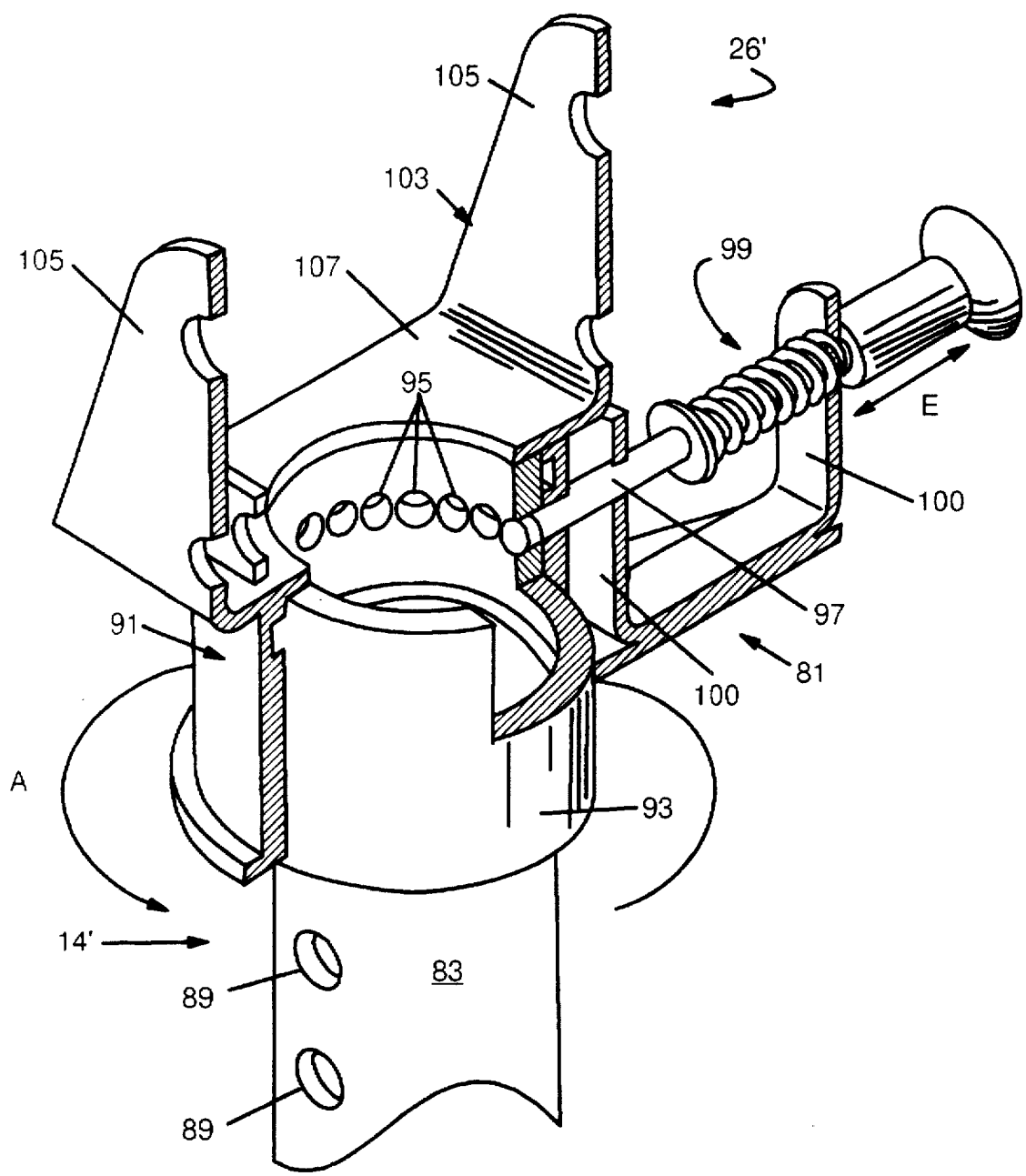
FIG. 9 is a partial three-dimensional view of part of the holder portion of the invention.

To provide the above unique rotational adjustment for member 42' of the invention's holder portion, base portion 14' includes a support column 16' and a first bracket assembly 81. The bracket assembly 81, as also seen in FIG. 9, is rotationally movable on the support column 16' within one (A) of the three planes. This is accomplished by providing the support column with inner and outer parts 83 and 85, respectively, the inner cylindrical part 83 also being vertically adjustable (direction D) within the fixedly positioned outer part 85. A pin 87, insertable through outer part 85 into a respective one of a plurality of openings 89 within inner part 83, is used to lock the inner part at a desired evaluation.

As better illustrated in FIG. 9, the first bracket assembly 81 comprises a rotational sleeve 91 which is rotationally movable on a third part 93 of the invention's base 14'. This third part 93, being fixedly secured to the cylindrical inner part 83 (at the top thereof), also includes a plurality of openings 95 which, as seen in FIG. 9, are adapted for receiving the protruding end 97 of a spring-biased pin member 99 which, as seen, is positioned within two upstanding flanges 100 of the first bracket assembly 81. Pin 99 is movable (direction E) to thus lock the first bracket 81 at a desired position within the first plane of rotational movement A. The first bracket assembly thus rotationally moves on the third part 93 and can be fixedly positioned with respect to part 93. The retractable spring-biased pin 99 differs from the pin 30 in the above embodiment of Ser. No. 08/645,461 by the inverting of the projecting flanges to extend in an upward manner and further by not requiring a relatively large plate structure such as shown in FIG. 5.

In accordance with the invention's teachings, base portion 14' further comprises a second bracket assembly 103 which may be directly attached to the first bracket structure or form an integral part thereof, as shown in FIG. 9. This second bracket assembly is thus fixedly secured to the first bracket assembly or forms part thereof. The second bracket assembly, as seen in FIG. 9, includes a pair of parallel, upstanding flanges 105 interconnected by a planar base 107. The cross-sectional illustration in FIG. 9 clearly illustrates the various parts of the first and second bracket assemblies relative to one another.

Figure 10:
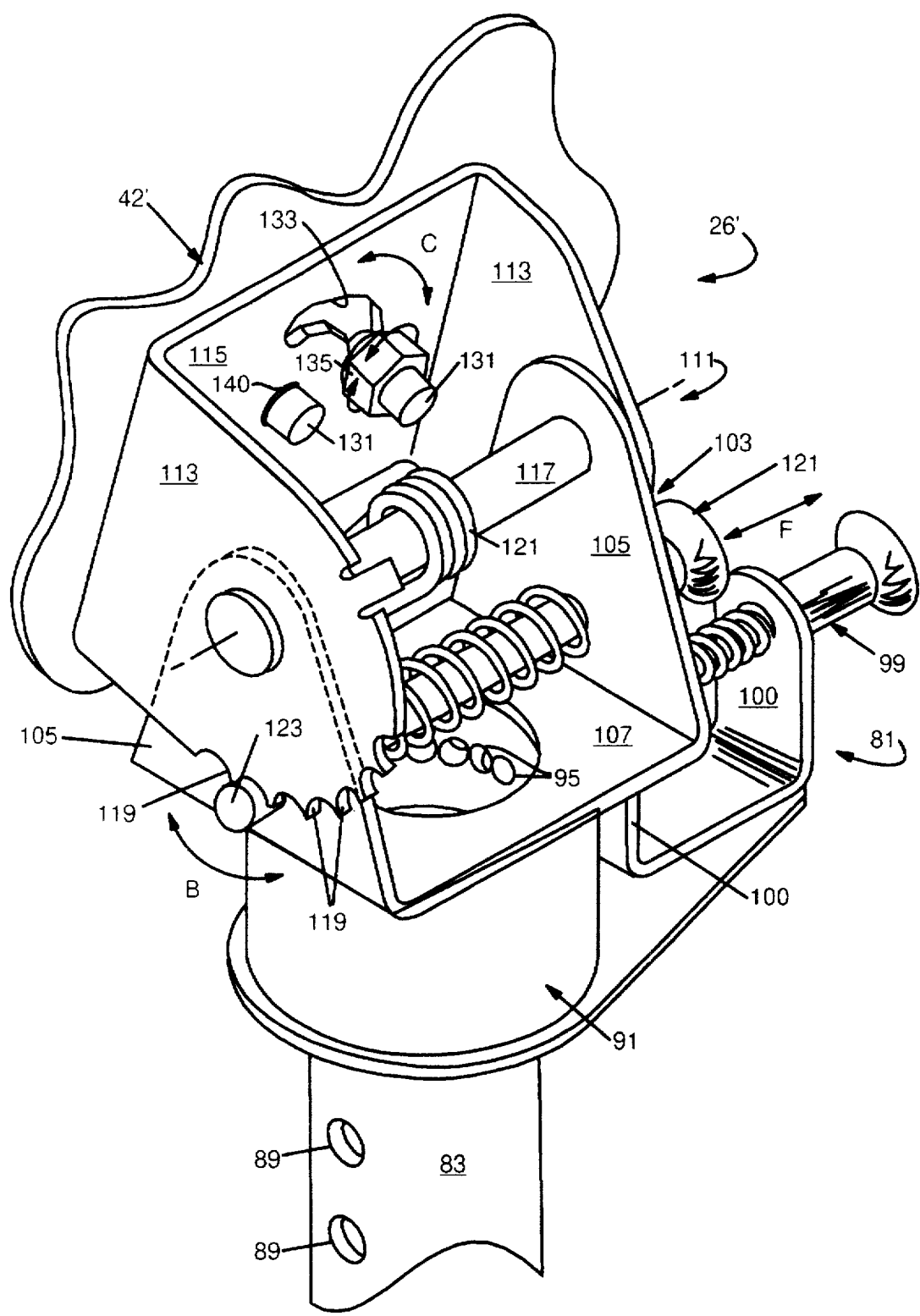
FIG. 10 is a much enlarged, partial three-dimensional view of part of the invention's holder portion illustrating more clearly the workings of two bracket assemblies of the invention.

In FIG. 10, the embodiment of the invention's holder portion as shown in FIGS. 8 and 9 is more fully illustrated. In FIG. 10, the invention's holder portion 26' is shown to further include a third bracket assembly 111 including two spaced-apart, parallel flanges 113 projecting outwardly from a common base 115. The third bracket assembly is rotationally movable with respect to the second bracket assembly 103 about a pivotal shaft 117 which extends through the aligned flange portions 105 and 113. The third bracket assembly 111 is adapted for being fixedly secured to the support plate member 42' which, as described, is designed for holding the portable computer therein. Bracket assembly 111 thus moves in a rotational manner (B) which, as seen in FIG. 8, is substantially perpendicular to the plane A. (That is, the central axis A—A of plane A is perpendicular to the central axis B—B of plane B.) Bracket 111 is preferably spring loaded (using a spring 121) to assist rotational movement in plane B. As further seen in FIG. 10, one of the flanges 113 includes a plurality of notches 119 therein which, when engaged by a second spring-biased pin 121, as seen, is movable in a linear direction (F). The forward portion 123 of pin 121 is designed for engaging one of the notches 119 when the preferred angle of rotation is attained. It is thus seen that the two rotational movements so far described for the two bracket assemblies 81 and 111 is easily attainable using merely a pair of spring-biased pins once the desired degree of rotational movement is attained.

In accordance with the unique teachings of this invention, the third bracket assembly 111 is connected to support plate member 42' in such a manner so as to allow rotational movement between these two elements. More specifically, the plate member 42' includes a pair of projecting pins 131 while the base 115 of assembly 111 includes a curvilinear slot 133 therein, one of the pins 131 designed for being positioned within slot 133 such that a means of retention (locking nut 135) may then be used on the pin (which is threaded) to lockingly position plate 42' when the desired angle of orientation is attained. Understandably, pin 131 is fixedly secured to or forms part of plate member 42'. It is also understood that the other pin 131 is positioned within an accommodating aperture 140 within base 115 in such a manner so as to allow the base to rotate thereabout.

The third form of rotational movement represented by the letter C in FIGS. 8 and 10 is understood to lie at an acute angle with respect to the vertical axis A—A of plane A. This acute angle is represented by the letter G in FIG. 8, while the angle between the axis A—A and B—B, is represented by the letter N (for normal) in FIG. 8.

Figure 11:
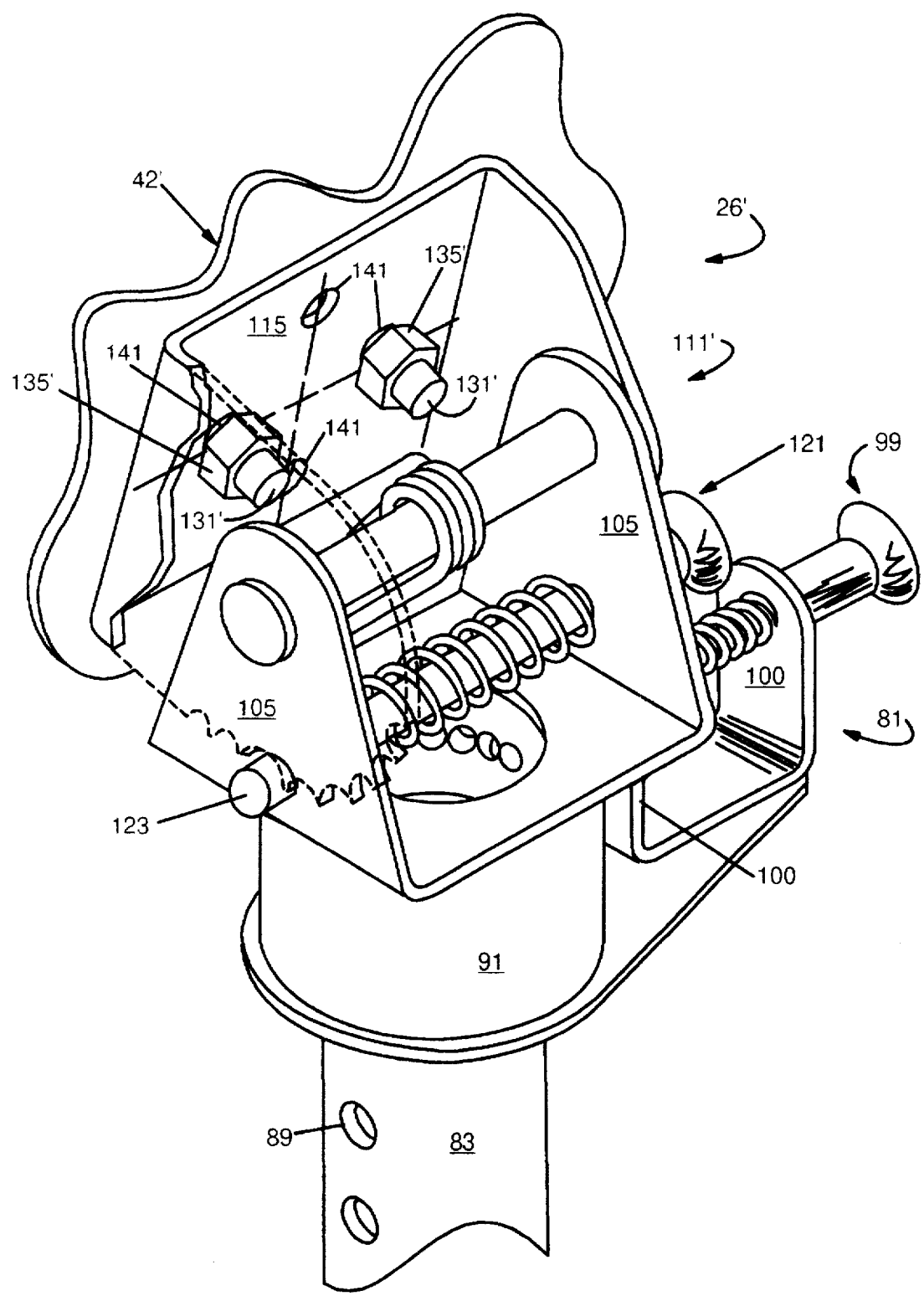
FIG. 11 represents an alternative embodiment of the invention's third bracket assembly, this partial three-dimensional view being much enlarged over FIG. 8.

In FIG. 11, the third bracket assembly 111" differs from that of assembly 111 so as to provide an alternative means for securing the support plate 42' in a desired rotational position on the bracket assembly's base 115'. In this embodiment, support member 42' includes two projecting pins 131', each extending through a singular aperture 141 within base 115' and adapted for being retained in position utilizing a locking nut 135'. Each pin 131' is capable of being positioned within a respective one of two pairs of openings 141 spacedly positioned relative to one another to allow the optimum rotational movement of support member 42'. The structure of FIG. 11 thus differs primarily over that of FIG. 10 by the utilization of two locking nuts 135' with individual positioning of these pins in corresponding apertures 141 when the desired angle of rotation within plane C is attained. Other apertures 141 can easily be provided to assure even further positioning options.

Thus it can be seen that the docking station 10 embodying the present invention provides a convenient protective holder for a portable computer which represents an improvement over the holder in Ser. No. 08/645,461. The holder portion can be rotatably moved in no less than three different planes to thereby assure facile viewing of the computer's viewable screen within the vehicle holding the computer. Furthermore, the invention's base portion can be conveniently mounted in the vehicle at a position that does not interfere with deployment of safety airbags, vehicle operation, nor with vehicle controls, e.g., heating and air conditioning controls and vents. The invention's holder portion can be locked in place at a predetermined open position with respect to the keyboard (if used) of the computer. The docking station embodying the present invention also provides a method of keeping the screen and hardware components of the computer (and keyboard, if used) at a minimum operating temperature irrespective of the temperature of the environment surrounding the computer. The defined heating elements enable the computer to be readily available during extremely cold weather when the vehicle is not in operation, maintaining the ambient temperature surrounding the computer at a minimum temperature (e.g., above 32° F.).

Although the present invention is described in terms of a preferred exemplary embodiment, those skilled in the art will recognize that changes, e.g., in heating element design, retention clip arrangement (for maintaining the screen in the holder's support member and the computer keyboard, if used, in the second support portion of the holder) and base member construction may be made without departing from the spirit of the invention. Likewise, the location of a port replicator, if used, may be at a position other than that shown and illustrated in the drawings. For example, the replicator may be positioned in the rear or at one side of the invention's support member if the portable computer is provided with input/output ports or other interface ports in a provided keyboard. Such changes clearly fall within the scope of the following claims. Other aspects, features and advantages of the present invention can be obtained from a study of this disclosure and drawings, along with the appended claims.

While there have been shown and described what are at present considered the preferred embodiments of the invention, it will be obvious to those skilled in the art that various changes and modifications can be made therein without departing from the scope of the invention as defined by the appended claims.

What is claimed is:

1. A docking station for a portable computer having a viewable screen, said docking station comprising:
   a base portion; and
   a holder portion positioned on said base portion and adapted for holding said portable computer therein, said holder portion being rotationally adjustable in at least three different planes and including a first bracket assembly rotationally adjustable on said base portion in one of said three different planes and a second bracket assembly rotationally adjustable in a second of said three different planes substantially perpendicular to said one of said planes in which said first bracket assembly is rotationally adjustable.

2. The docking station of claim 1 further including a third bracket assembly fixedly secured to said first bracket assembly, said second bracket assembly being rotationally adjustable on said third bracket assembly.

3. The docking station of claim 1 wherein a third of said three different planes is oriented at an acute angle with respect to said one of said three different planes in which said first bracket assembly is rotationally adjustable.

4. The docking station of claim 1 wherein said base portion comprises a support column, said first bracket assembly being rotationally adjustable on said support column in said one of said three different planes.

5. The docking station of claim 4 wherein said support column includes an outer part, and an inner part movably positioned within said outer part.

6. The docking station of claim 5 wherein said inner part is movable in a substantially linear manner within said outer part.

7. The docking station of claim 4 wherein said first bracket assembly includes a rotational sleeve, said rotational sleeve being rotationally movable on said support column.

8. The docking station of claim 1 wherein said holder portion further includes a support member, said support member rotationally adjustable with respect to said second bracket assembly.

9. The docking station of claim 1 further including means for heating said portable computer when said portable computer is positioned in said holder.

10. The docking station of claim 11 wherein said means for heating said portable computer includes a resistance heating element mounted on said holder portion.

11. The docking station of claim 1 wherein said holder portion further comprises a keyboard support member adapted for supporting a keyboard unit associated with said portable computer, and a screen support member adapted to support said viewable screen of said portable computer, said screen support member being pivotally connected to said keyboard support member.

12. The docking station of claim 11 wherein said means for heating said portable computer includes a first heating element mounted on said keyboard support member and a second heating element mounted on said screen support member.

13. The docking station of claim 12 wherein said first and second heating elements have a thin pad construction with heating elements disposed therein.

14. The docking station of claim 10 wherein said means for heating said portable computer is electrically coupled to an external power source other than the power source of said motor vehicle.

15. A vehicular computer assembly comprising:
   a portable computer including a viewable screen;
   a base portion adapted for being positioned within a motor vehicle; and
   a holder portion positioned on said base portion and including means for holding said portable computer therein such that said viewable screen of said portable computer can be rotationally adjusted in at least three different planes, said holder portion further including a first bracket assembly rotationally adjustable on said base portion in one of said three different planes and a second bracket assembly rotationally adjustable in a second of said three different planes substantially perpendicular to said one of said planes in which said first bracket assembly is rotationally adjustable.

16. The vehicular computer assembly of claim 15 wherein said viewable screen of said portable computer is retained by said holder portion during said rotational adjustment of said viewable screen.

17. The vehicular computer assembly of claim 15 wherein said portable computer further includes a keyboard portion, said keyboard portion being retained by said holder portion during said rotational adjustment of said viewable screen.

18. The vehicular computer assembly of claim 15 further including a port replicator positioned on said holder portion and electrically coupled to said portable computer.

19. The vehicular computer assembly of claim 15 wherein said portable computer is pen-actuated.

20. The vehicular computer assembly of claim 15 further including means for heating said portable computer when said computer is positioned within said holder portion.

21. The vehicular computer assembly of claim 20 wherein said means for heating said portable computer comprises a resistance heating element mounted on said holder portion.

22. The vehicular computer assembly of claim 15 wherein said means for heating said portable computer is electrically coupled to an external power source other than the power source of said motor vehicle.

* * * * *